Patented July 5, 1927.

1,634,850

UNITED STATES PATENT OFFICE.

EMMETT POWERS, OF DENVER, COLORADO, ASSIGNOR OF ONE-THIRD TO AUSTIN R. KRACAW, OF DENVER, COLORADO.

ELECTRIC BATTERY AND PROCESS OF MAKING THE SAME.

No Drawing.     Application filed June 8, 1926. Serial No. 114,571.

This relates to improvements in electric batteries and the process of making the same.

The chief object of my invention is to provide an electric battery having a longer life than usual and which delivers a larger constant voltage than corresponding batteries of other types. A further object of my invention is to provide a battery having a lower internal resistance and which delivers a larger percentage of available current than the ordinary type of wet battery. One object of my invention is to provide an improved battery which is stronger and more efficient, because of its higher voltage and quicker pick-up after discharge, whether that discharge be fast or slow. Another object of my invention is to provide an improved battery in which less current will be required to recharge the battery to its full capacity. Another object of the invention is to provide a battery of such a character that cracked battery jars or separators do not affect injuriously the delivery of current from the battery. Another object of my invention is to provide a battery having an electrolyte which will not freeze when the battery is completely discharged. A further object of my invention is to provide an improved battery using an electrolyte which has a slight hardening action on the battery plates and thereby prevents the shedding of active material from the plates, crystallization of lead sulphate upon the plates and over-heating when the charged plates are exposed to the air.

A further object of my invention is to provide a battery having all the advantages of a dry battery, in that it uses a solid electrolyte but is rechargeable any number of times up to the end of the life of the battery, and which has a higher voltage per cell than the dry battery in ordinary use, and delivers current at a more constant or uniform voltage. Another object of my invention is to provide an electric battery having a solid electrolyte which will not become dry and crack away from the plates, so that adequate contact between the electrolyte and the plates is insured for the passage of the electric current. Another object of my invention is to provide a battery using a solid electrolyte of such a nature as to absorb moisture from the air so that the exposure of charged plates to the air will not result in over-heating or destruction of the plates. A further object of my invention is to provide a battery having an electrolyte of the solid type which constitutes an improved conducting medium and in which the porosity of the gel forming the body of the electrolyte is increased.

In general, I accomplish the objects of my invention by providing plates which are prepared by mixing the active material into a paste with a liquid electrolyte including a substantial proportion of phosphoric acid, which paste is then applied to the plates and allowed to dry until set or hardened, after which the plates are formed in accordance with the usual practice. I further provide a solid electrolyte made by the action of a mixture of phosphoric and sulphuric acids upon a solution of sodium silicate, forming a jelly like mass which is substantially solid. This may be mixed with diatomaceous earth. I further propose to use as a liquid electrolyte, in cases where a wet battery is desirable, a mixture of phosphoric and sulphuric acids, or, in some cases, to use phosphoric acid without the addition of the sulphuric acid.

In preparing the negative plates of my improved battery, I mix ten parts, by weight, of minium ($Pb_3O_4$), with eighty parts of litharge (PbO), five parts of specially prepared diatomaceous earth, two parts of magnesium sulphate, and three parts of lead sulphate. These ingredients are all mixed thoroughly together and then made into a paste with a liquid electrolyte composed of twenty-five parts, by volume, of phosphoric acid of 85% strength, twenty-five parts, by volume, of sulphuric acid of 1.835 sp. gr., and fifty parts of water. The paste thus formed is pasted upon the grid or skeleton of the plate and is allowed to dry until it has set sufficiently and has hardened. The plate is then formed by passing an electric current through it in accordance with the usual practice in forming battery plates.

The positive plate is formed by mixing eighty parts, by weight, of minium ($Pb_3O_4$), ten parts of litharge (PbO), five parts of specially prepared diatomaceous earth, two parts of magnesium sulphate, and three parts of lead sulphate. This mixture of ingredients is made into a paste with the same liquid electrolyte used in preparing the negative plates and, after this paste has been applied to the grid and has set, the plate is formed by passing an electric current through it in accordance with the usual practice.

After the positive and negative plates have been prepared and formed as above described, they are assembled into suitable batteries and cycled, or repeatedly charged and discharged, using a liquid electrolyte prepared in the following manner. Twenty-five grams of magnesium oxide are dissolved in 900 c. c. of sulphuric acid of 1.835 sp. gr. and twenty-five parts, by volume, of this sulphuric acid solution of magnesium oxide are then mixed with twenty-five parts, by volume, of phosphoric acid of 85% strength, and fifty parts, by volume, of water. The charging and discharging of the plates in this electrolyte is repeated several times, or until the plates have reached their maximum capacity.

After the plates have been formed and cycled and are fully charged, the liquid electrolyte is removed and a solid electrolyte substituted, which is prepared in the following way. I, first, take diatomaceous earth and treat it with a five percent solution of hydrochloric acid, in order to remove such impurities as iron and calcium. The earth is then washed thoroughly with pure water until all acid is removed and then dried. I next add five percent of magnesium oxide, by weight, to sulphuric acid of 1.835 specific gravity, and mix this sulphuric acid solution of magnesium oxide with phosphoric acid of 85% strength in the proportion of twenty-five parts, by volume, of phosphoric acid, twenty-five parts, by volume, of sulphuric acid solution of magnesium oxide, and fifty parts, by volume, of water. I add seven parts, by weight, of the diatomaceous earth, treated as above described, to the mixture of phosphoric and sulphuric acids, with three parts, by weight, of dry powdered magnesium silicate, prepared by a special chemical decomposition process. After the above ingredients have been thoroughly mixed, I then add twenty-two parts, by volume, of a solution of sodium silicate prepared by dissolving 75 c. c. of sodium silicate in 125 c. c. of water. The mixture thus prepared is now poured quickly into the empty battery jar containing the specially prepared and processed plates and quickly forms a solid, or substantially solid, uniform mass.

The phosphoric acid may be used in strength between 10% and 40%, by volume, but I have found that phosphoric acid of 25% strength gives the best results. An essential feature of my invention is the use of phosphoric acid in the electrolyte and I do not wish to be restricted to the use of phosphoric acid, per se, but many of the desirable qualities may be secured by the use of other chemical compounds containing a phosphoric acid radical in which the qualities of the acid have not been destroyed, such as chloro compounds or other acid radicals and esters such as glyceryl phosphoric acid and the like. Although I have described my invention in connection with a solid electrolyte, I have also found that a very desirable liquid electrolyte for use with wet batteries may be formed by using a mixture of sulphuric and phosphoric acids, or by using phosphoric acid alone. I further find that phosphoric acid, in strength varying from 10% to 70% may be used, without the addition of sulphuric acid, in the formation of the solid electrolyte which I have described above.

I have found that this solid electrolyte described above does not become dry and crack away from the plates and that, therefore, an adequate contact is always insured for the passage of the electric current. I believe that this is due to the presence of phosphoric acid in the solid electrolyte, constituting a valuable agent in keeping the the electrolyte from becoming dry. Furthermore, the phosphoric acid being non-volatile and attracting moisture from the air, and being miscible with sulphuric acid in all proportions, so dilutes the sulphuric acid in the electrolyte that, upon exposure of the charged plates to the air, there is no over-heating or destruction of the charged plates, and no heavy crystallization of lead sulphate as is common with batteries using the ordinary sulphuric acid electrolyte. I have found that this battery gives a very large proportion of available current and I believe that this is due to the addition of the phosphoric acid, which enters into chemical combination with the active material on the plates after the sulphuric acid has become dissipated, with the result that more current is made available. I find that this particular solid electrolyte maintains a larger constant voltage than other batteries, either wet or solid, and that, furthermore, any evaporation that might take place under ordinary circumstances does not result in a destructive action upon the plates. I find that the internal resistance of the battery is so lowered, probably because of the formation of lead sulphate and lead phosphate in close proximity, and because the electrolyte is of a colloidal nature and the above are formed in an amorphous instead of a crystalline state, that less current is required to charge the battery to full capacity. Furthermore, cracked jars or separators do not retard the delivery of current from the battery and it cannot freeze, even when in a completely discharged condition.

I have found that the use of phosphoric acid as an electrolyte, in a wet battery, is also highly desirable because this liquid cannot freeze when the plates are completely discharged and it also has a slight hardening action on the plates, so as to prevent the shedding of the active material from the grid, as in the case of the ordinary battery using sulphuric acid as the electrolyte, and, furthermore, when the plates are exposed in a charged condition to the air there is no heavy crystallization of lead sulphate or over-heating of the plates.

I have found that very desirable results are secured by dissolving magnesium oxide in the sulphuric acid before the latter is mixed with phosphoric acid, in the formation of the solid electrolyte. It is my belief that this magnesium oxide is first transformed into magnesium bisulphate or magnesium acid sulphate. I believe that, by treating the specially prepared diatomaceous earth with a mixture of phosphoric acid and this sulphuric acid solution of magnesium oxide, the electrolyte is absorbed and the colloidal silicic acid is only formed around the particles of earth thereby producing a better conducting medium and increasing the porosity of the gel. I believe that the magnesium silicate is not dissolved by the acid, as the electrolyte solidifies before such solution is formed and, consequently, this magnesium silicate, because of its strong water holding properties, is a valuable addition to help in keeping down the evaporation of water and in making my solid electrolyte superior to those heretofore known in other solid batteries, because it does not lose moisture as rapidly.

The battery constructed in accordance with this specification, I have found to be stronger and more efficient than those heretofore known, because of its higher voltage over the wet battery and because of its quicker pick-up of voltage after it has been discharged, whether the discharge has been slow or fast. Therefore, this battery gives more available current for its size than corresponding batteries of the types heretofore known. Furthermore, the mixture of sulphuric and phosphoric acids, and the embodiment of the same in an electrolyte of the solid type, results in the elimination of corrosive action on the terminals. I believe that the battery described is far superior to the ordinary non-rechargeable dry cells or primary batteries, because it has all the advantages of the dry cell since it is solid, and, in addition to that, may be recharged any number of times up to the end of the life of the battery. Furthermore, it has a higher voltage per cell, the voltage is more constant and because of the higher voltage, and its immediate increase when not in use, a whiter light is produced where the battery is used as a source of current for an electric lamp.

I am aware that my invention is susceptible of considerable variation without departing from the spirit thereof and, therefore, I claim the invention broadly, as pointed out by the appended claims.

What I claim is:

1. In a battery, an electrolyte comprising a mixture of silicic and phosphoric acids.

2. In a battery, an electrolyte comprising a mixture of silicic, sulphuric and phosphoric acids.

3. In a battery, an electrolyte comprising a mixture of diatomaceous earth, silicic acid, phosphoric acid and magnesium silicate.

4. In a battery, an electrolyte comprising a mixture of diatomaceous earth, silicic acid, phosphoric acid, sulphuric acid and magnesium silicate.

5. In a battery, an electrolyte comprising a mixture of diatomaceous earth, silicic acid, phosphoric acid, sulphuric acid, magnesium silicate and magnesium acid sulphate.

6. The method of preparing an electrolyte for use in a battery consisting in adding magnesium oxide to sulphuric acid and mixing phosphoric acid with the solution of magnesium oxide in sulphuric acid.

7. The method of preparing an electrolyte for use in a battery consisting in mixing phosphoric and sulphuric acids and adding the mixture of such acids to a solution of sodium silicate.

8. The method of preparing an electrolyte for use in a battery comprising the mixing of phosphoric and sulphuric acids, adding diatomaceous earth to such mixture, and adding the mixture of such acids and earth to a solution of sodium silicate.

9. The method of preparing an electrolyte for a battery comprising the addition of magnesium oxide to sulphuric acid, the mixing of phosphoric acid with the solution of magnesium oxide in sulphuric acid, the addition of diatomaceous earth to the mixture and mixing with a solution of sodium silicate.

10. The method of preparing an electrolyte for a battery comprising mixing phosphoric and sulphuric acids, adding to the mixture of such acids magnesium silicate, and mixing with a solution of sodium silicate.

11. The method of preparing an electrolyte for a battery comprising dissolving magnesium oxide in sulphuric acid, mixing phosphoric acid with the sulphuric acid solution of magnesium oxide, adding diatomaceous earth to said mixture of phosphoric and sulphuric acids, and adding the resulting mixture and magnesium silicate to a solution of sodium silicate.

12. The method of preparing an electrolyte for use in a battery comprising the treatment of diatomaceous earth to remove all traces of iron and calcium, the addition of magnesium oxide to sulphuric acid, the mixture of sulphuric acid thus treated with phosphoric acid, the addition of the purified diatomaceous earth to such mixture of phosphoric and sulphuric acids, the addition of magnesium silicate to this mixture, and the mixing of the resulting mixture with a solution of sodium silicate.

13. The method of preparing an electrolyte for use in a battery comprising the treatment of diatomaceous earth with hydrochloric acid in order to remove traces of iron and calcium, the addition of 5% by weight of magnesium oxide to sulphuric acid, the mixture of phosphoric acid with such sulphuric acid solution of magnesium oxide in the proportion of twenty-five parts, by volume, of phosphoric acid, twenty-five parts of sulphuric acid and fifty parts of water, the addition of seven parts, by weight, of the purified diatomaceous earth to this mixture of acids, the addition of three parts, by weight, of magnesium silicate to this mixture, and the addition of twenty-two parts by volume of this mixture to a solution of sodium silicate prepared by dissolving 75 c. c. of sodium silicate in one hundred and twenty-five c. c. of water.

EMMETT POWERS.